United States Patent
Linehan et al.

(10) Patent No.: US 6,813,537 B2
(45) Date of Patent: Nov. 2, 2004

(54) CONNECTION ERROR DETECTION AND RESPONSE

(75) Inventors: Thomas Linehan, Clarkston, MI (US); Fred Schroeder, Shelby Township, MI (US); John Khalaf, Farmington Hills, MI (US); Todd Johnston, Oxford, MI (US)

(73) Assignee: D-M-E Company, Madison Heights, MI (US)

( * ) Notice: Subject to any disclaimer, the term of this patent is extended or adjusted under 35 U.S.C. 154(b) by 0 days.

(21) Appl. No.: 10/301,228

(22) Filed: Nov. 21, 2002

(65) Prior Publication Data

US 2004/0102868 A1 May 27, 2004

(51) Int. Cl.[7] .............................................. G06F 19/00
(52) U.S. Cl. ....................... 700/204; 324/537; 324/538; 324/539; 324/66; 324/158.1
(58) Field of Search .................. 700/204; 324/537, 324/538, 539, 66, 158.1

(56) References Cited

U.S. PATENT DOCUMENTS

| | | | |
|---|---|---|---|
| 3,492,571 A | * | 1/1970 | Desler ........................ 324/523 |
| 3,636,448 A | * | 1/1972 | Nihashi et al. ......... 324/140 R |
| 3,892,928 A | * | 7/1975 | Casterline et al. ............. 379/12 |
| 4,524,321 A | * | 6/1985 | Jablway et al. ............... 324/66 |
| 4,879,739 A | * | 11/1989 | Forson ........................ 379/21 |
| 4,963,820 A | | 10/1990 | Medlin |
| 5,181,858 A | | 1/1993 | Matz et al. |
| 5,330,370 A | | 7/1994 | Reddersen et al. |
| 5,408,577 A | | 4/1995 | Weber, Jr. et al. |
| 5,795,511 A | | 8/1998 | Kalantzis et al. |
| 5,836,785 A | * | 11/1998 | Lee ............................. 439/505 |
| 6,161,915 A | * | 12/2000 | Bolash et al. ................. 347/19 |
| 6,256,881 B1 | * | 7/2001 | Starkey ....................... 29/858 |
| 6,452,402 B1 | * | 9/2002 | Kerai ......................... 324/538 |
| 2003/0141875 A1 | * | 7/2003 | Seymour .................... 324/525 |

FOREIGN PATENT DOCUMENTS

| | | |
|---|---|---|
| DE | 19851473 A1 | 5/2000 |
| EP | 0333233 A2 | 9/1989 |
| EP | 0768433 A1 | 4/1997 |
| WO | WO 94/08278 A1 | 4/1994 |

* cited by examiner

*Primary Examiner*—Leo Picard
*Assistant Examiner*—Michael D. Masinick
(74) *Attorney, Agent, or Firm*—John W. Gregg; Stephen H. Friskney (57) ABSTRACT

In an electrical apparatus wherein electrical devices are interconnected by coupling connectors and a desired interconnection of devices is achieved by an intended interconnection of mating components of coupling connectors, identification elements in one mating component of each connector produce identification signals representing identity of the mating component. Decoding means responsive to the identification signals produce an error signal representing an interconnection of connector components differing from the intended interconnection and, means responsive to the error signal effects a response when the actual interconnection of components differs from the intended interconnection of components. Responses are, advantageously, activation of an error indicator, inhibition of application of power to affected devices, or, with program controlled systems, display of a text error message, facilitation of user intervention for error correction, or automated re-programming to overcome interconnection errors.

17 Claims, 4 Drawing Sheets

CONNECTION ERROR DETECTION AND RESPONSE

BACKGROUND OF THE INVENTION

I. Field of the Invention

This invention relates generally to interconnection of electrical devices. In particular, this invention relates to detection of and response to errors in interconnection of electrical devices.

II. Description of Related Art

In electrical systems wherein devices are interconnected via cabling having substantially similar coupling connectors, it is known to provide physical keying elements to prevent incorrect mating of connector components. In general, the number of useable arrangements of physical keying elements is very limited and they are susceptible of failure of their intended purpose through loss or damage. It is also known to provide particular electrical contact elements for device identification in a plurality of connectors interconnected in electrical parallel (as in an electrical bus structure). Such arrangements are well known in computer equipment where plural devices are interconnected over a common electrical bus. In industrial apparatus such as equipment heating systems, heating devices are widely separated from their controllers and operate at high voltages at relatively high currents. In applications wherein equipment is routinely replaced, such as tooling assemblies for molding equipment, it is advantageous to provide connectors interposed between heaters and controllers. In such systems, similarities in connectors make it possible to interconnect devices and controllers contrary to a desired interconnection. Hence, there is a need to provide detection of instances of undesired interconnection of electrical devices and to effect a response to detection of interconnection errors.

SUMMARY OF THE INVENTION

It is an object of the present invention to detect undesired interconnection of electrical devices and provide a response thereto.

It is a further object of the present invention to detect undesired interconnection of electrical devices wherein plural devices are interconnected by plural coupling connectors, each connector comprising mating components wherein there is a desired interconnection of mating components to achieve a desired interconnection of devices and provide a response to the detection of undesired interconnection.

It is a still further object of the present invention to detect undesired interconnection of electrical devices wherein plural devices are interconnected by plural coupling connectors, each connector comprising mating components wherein there is a desired interconnection of mating components to achieve a desired interconnection of devices, and wherein mating components include identification elements for producing identification signals, and decoding means decode the identification signals and diagnostic means detect interconnection errors and means responsive to detection of interconnection errors generate an alarm when the actual interconnection of devices differs from the desired interconnection of devices.

It is a still further object of the present invention to provide interconnection of electrical devices wherein plural electrical heaters are connected to plural controllers, the controllers, and interposed between the heaters and the controllers are plural coupling connectors, each connector comprising mating components wherein there is a desired interconnection of mating components to achieve a desired interconnection of heaters and controllers, and wherein mating components include identification elements for producing identification signals, and decoding means decode the identification signals and diagnostic means detect interconnection errors and an interlock responsive to the diagnostic means prevents application of power to the heaters when the actual interconnection of heaters and controllers differs from the desired interconnection of heaters and controllers.

It is a further object of the present invention to provide interconnection of electrical devices wherein plural electrical heaters are connected to plural program controlled controllers by a plurality of coupling connectors, each coupling connector comprising mating components wherein there is a desired interconnection of mating components to achieve a desired interconnection of heaters and controllers, and mating components include identification elements for producing identification signals, decoding means decode the identification signals and means responsive to the decoding means alter programming of the controllers to effect operation of the heaters according to the desired interconnection of heaters and controllers irrespective of the actual interconnection of mating components.

Further objects and advantages of the invention shall be made apparent from the accompanying drawings and the following description thereof.

In accordance with the aforesaid objects the present invention improves interconnection of electrical devices wherein a desired interconnection of devices is achieved by an intended interconnection of mating components of coupling connectors. Identification elements in one mating component of each connector produce identification signals representing identity of the mating component; decoding means responsive to the identification signals produce an error signal representing an interconnection of connector components differing from the intended interconnection; and, means responsive to the error signal effects a response when the actual interconnection of components differs from the intended interconnection of components. Responses are, advantageously, activation of an alarm indicator, inhibition of application of power to affected devices, or, with program controlled systems, display of a text error message, facilitation of user intervention for error correction, or automated re-programming to overcome interconnection errors.

DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Elementary Controllers

Figure 1:
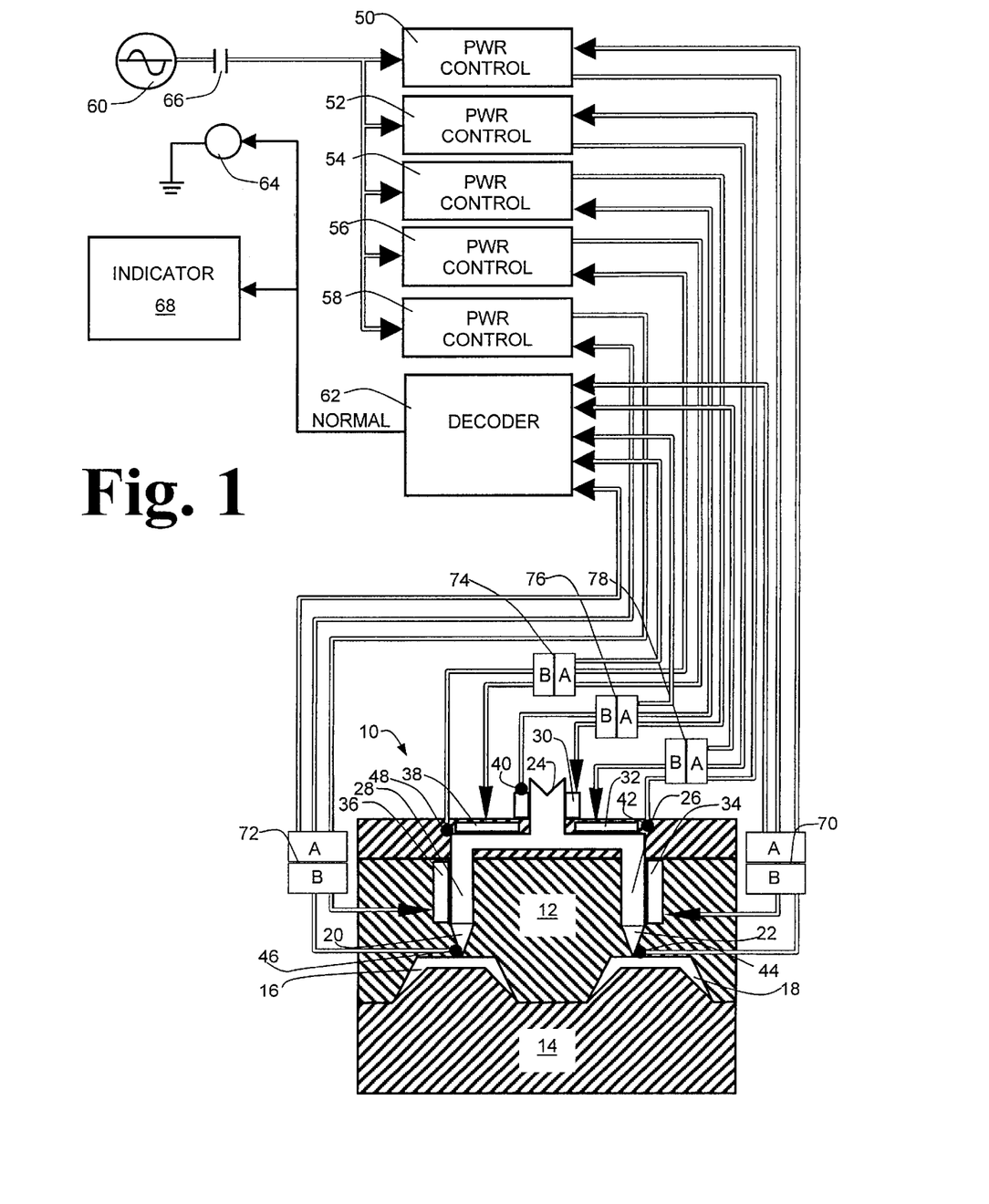
FIG. 1 is a block diagram of a heater system for molding equipment.

Referring to FIG. 1, a mold assembly 10 comprises mold halves 12 and 14 defining mold cavities 16 and 18 along the parting line of the mold halves. Cavities 16 and 18 determine the shape, size and finish of articles to be molded using mold assembly 10. Molding is effected by introduction of flowable material into cavities 16 and 18 through nozzles 20 and 22 respectively, solidification of the flowable material, and separation of mold halves 12 and 14 to permit removal of the finished articles. Flowable material is introduced to mold assembly 10 at inlet 24 and is directed through channels 26 and 28 to nozzles 20 and 22. The flowable material may be molten material, a curable slurry comprising self binding solids, or reactants that when combined produce a reaction product that solidifies by, for example, chemical reaction. Examples of molten materials include thermoplastics and metals. In connection with the preferred embodiment, it shall be presumed that the material to be molded is thermoplastic.

Continuing with reference to FIG. 1, it will be understood that complete filling of cavities 16 and 18 is essential to producing articles of acceptable quality. Hence, it is desirable to maintain the flowable condition of the material from inlet 24 through nozzles 20 and 22 to cavities 16 and 18. With thermoplastic material, it may be necessary to replace heat lost from the material (the so-called "melt") to maintain the desired flowable condition. Hence, heaters 30, 32, 34, 36 and 38 are provided to transfer heat to the melt at inlet 24 and in channels 26 and 28. Inlet 24, nozzles 16 and 18, channels 26 and 28, and heaters 30–38 comprise a so-called "hot runner system". The hot runner system is intended to maintain a desired flowable condition of melt from inlet 24 through nozzles 20 and 22. Although not shown in FIG. 1, known "hot runner systems" may include a combination of electrical heaters and heat transfer fluid conduits with flow controllers such as electrically operated valves.

Continuing with reference to FIG. 1, heaters 30–38 convert electrical energy to heat. Electrical power applied to heaters 30–38 determines the amount of heat produced. To regulate the application of power, temperature proximate the heaters is sensed by sensors 40, 42, 44, 46, and 48. Temperature sensors may be thermocouples or remote temperature detectors as are well known. Each combination of a heater and sensor defines a "zone" for regulation of applied power. Each of controllers 50, 52, 54, 56, and 58 are interconnected with a combination of a heater and sensor to control application of power to a zone. Each of controllers 50–58 controls electrical energy delivered from source 60 to the attached heater in accordance with sensed temperature and a desired temperature for the zone. Electrical energy from source 60 may be alternating current, as indicated in FIG. 1 or may be direct current. As is well known for control of power applied to a load, controllers 50–58 advantageously include solid state switching devices that are controllably conductive to transfer electrical energy from source 60 to heaters 30–38.

As it is commonly desirable that molding assemblies and applied hot runner systems be readily exchangeable in the press portion of a molding machine, it is advantageous to provide coupling connectors to provide interconnections between controllers 50–58 and the hot runner system. While shown in FIG. 1 as separate connectors 70–78 for five zones, conductors for plural zones may be combined at a single connector. Each of connectors 70–78 comprises mating components, designated "A" and "B" in FIG. 1. The mating components are conventional and may be constructed wherein one mating component provides projecting conductive pins and the other provides conducting receptors for the pins. Each of the pins and receptors terminates a conductor at the mating component. With components A and B fitted together, the projecting pins of one component are inserted in the receptors of the other providing a conductive connection by which the conductors are interconnected. As is conventional, such components are suitable for repeated interfitting and separation without loss of the quality of the electrical connection achieved through the connectors. Other constructions of mating components are well known and may be used in the practice of the invention.

In the practice of the invention for hot runner systems, connectors 70–78 are proximate mold assembly 10. Conductors from heaters 30–38 and sensors 40–48 are terminated at the B components of connectors 70–78. Conductors from controllers 50–58 are terminated at the A components of connectors 70–78. As illustrated in FIG. 1 all of connectors 70–78 are substantially similar in size and configuration and would permit fitting together of any of the B components with any of the A components. The invention contemplates that elements that serve to connect identification signals representing the particular connector will be included in each of the A and B components. Identification could simply be represented by the presence or absence of a single signal out of a number of signals. For example, for five connectors, each would include five elements for identification signals, a single element carrying a signal distinct from the other four at each connector. It is not necessary that the identification signal carrying elements be arranged in any particular physical pattern or occupy particular locations in the connector components. It is necessary that the identification signal carrying elements be uniformly arranged in all connectors of a single system to insure the identification signals will appear at the same elements of each component.

As is well known, identification signals may be advantageously represented by combinations of ground and a signal voltage such as a low level direct current voltage. Hence, to produce a desired combination of identification signals at a connector component, the identification signal carrying elements may be connected as appropriate to respectively, ground or signal voltage. Connections of the ground and signal voltage to the connector elements may be effected at a connector component using minimal length conductors ("jumpers") between connector elements or between conductors attached to the connector elements; by switches to which the identification elements are connected; or, by a coded switch to which the identification elements are connected. As the A components of connectors 70–78 terminate conductors from controllers 50–58, signal voltage and ground is advantageously supplied from sources proximate controllers 50–58 to the A components. Connections of identification signal carrying elements at the B components to the respective ground and signal voltage is advantageously made by jumpers at the B components. In such an arrangement, the identification signals produced by interconnection of the A and B components are then available via conductors from the A components to a remote decoder such as decoder 62 proximate controllers 50–58.

It will be appreciated that for more than a few connectors, the use of single identification signals in a "one of N" representation is inefficient in respect of use of connector elements for identification. Conversely, identification signals representing, for example, a binary code, require fewer component elements to uniquely identify the same number of connectors. For example, using a binary code, up to two connectors require a single identification element in each connector; up to four connectors require two identification elements in each connector; up to eight connectors require three identification elements in each connector; and, up to 16 connectors require four identification elements in each connector (see Table 1). The examples of Table 1 are readily susceptible of extension to any number of connectors and associated binary codes and the invention is not limited in its applicability to a predetermined number of connectors. Use of a binary code dramatically reduces the number of required connector elements required for identification signals as compared to "one of N" representations.

TABLE 1

| No. of Conn. | Code Conn. 1 | Code Conn. 2 | Code Conn. 3 | Code Conn. 4 | Code Conn. 5 | Code Conn. 6 | Code Conn. 7 | Code Conn. 8 |
|---|---|---|---|---|---|---|---|---|
| 1–2 | 0 | 1 | | | | | | |
| 1–4 | 00 | 01 | 10 | 11 | | | | |
| 1–8 | 000 | 001 | 010 | 011 | 100 | 101 | 110 | 111 |
| 1–16 | 0000 | 0001 | 0010 | 0011 | 0100 | 0101 | 0110 | 0111 |

| No. of Conn. | Code Conn. 9 | Code Conn. 10 | Code Conn. 11 | Code Conn. 12 | Code Conn. 13 | Code Conn. 14 | Code Conn. 15 | Code Conn. 16 |
|---|---|---|---|---|---|---|---|---|
| 1–16 | 1000 | 1001 | 1010 | 1011 | 1100 | 1101 | 1110 | 1111 |

Irrespective of the nature of the identification signals, it is desired to determine that the interconnection of A and B components of connectors 70–78 is as desired. This is achieved by decoding and/or comparison of the identification signals generated at the B component to signals representing an intended or expected connector identification. For identification signals wherein one of several is unique, comparison of only a single signal for each connector is required. For identification signals representing a binary code, the comparison may be done for plural signals using known binary comparator circuitry. In the case of a four bit binary code, comparison may be made by a four bit comparator, indicating equality or inequality of the identification code and the desired code. In such an arrangement, absence or presence of equality constitutes a single binary indicator of an interconnection error of A and B components. Alternatively, the identification code may be decoded to a single signal representing the particular connector component. For example a four bit binary code can be decoded to one signal representing any one of sixteen possible combinations of the four binary digits using known binary decoding circuitry. After such decoding, only a single output of the decoder need be compared to the appropriate signal to detect interconnection errors. The results of the comparisons for all connectors can be combined logically or sequentially to produce a single signal indicating whether or not the actual interconnection of A and B components is as desired. As used herein and in the appended claims, "decoding" shall include comparison to detect equality as well as detection of one of a number of possible combinations ("one of N") of the identification signals and shall include decoding followed by comparison as described and the terms "decoder" or "decoding means" shall mean devices and/or combinations of devices suitable for performing such "decoding". Further, where "decoding" is effected for plural sets of identification signals sequentially, the decoding means shall be understood to include means for storing detection of an interconnection error until the error condition is corrected.

In the event actual interconnection of A and B components does not correspond to the intended interconnection, i.e., actual interconnection is erroneous, it is desirable to respond so as to protect the interconnected equipment from undesired operation. A response contemplated by the present invention is to actuate an indicator that there is an equipment abnormality. A further response contemplated by the present invention is that power not be applied to at least those of heaters 30–38 that are not interconnected with the desired ones of controllers 50–58. As described, the decoding means produces an error signal indicating an interconnection of A and B components that is in error, labeled "NORMAL" in FIG. 1. In general, a response is effected by means responsive to the error signal. The NORMAL signal of FIG. 1 is, advantageously false, when an interconnection error exists. As an example of a first contemplated response, the error signal may be used to control an audible or visible indicator or alarm 68 so that when "NORMAL" is false the indictor or alarm is activated. As an example of a second contemplated response, the NORMAL signal is advantageously applied to inhibit application of power through the affected controllers to the affected heaters. For example, the NORMAL signal may be applied to a coil, such as coil 64 of FIG. 1, of an electromagnetic relay having normally open contacts 66 connected between source 60 and controllers 50–58. When the NORMAL signal is true, the relay is actuated, contacts 66 are closed, and power is conducted. In such an arrangement, until relay coil 64 is energized by the NORMAL signal, power is not applied to any of heaters 30–38.

Program Controlled Systems

Application to a hot runner system including program controlled heater controls shall be described with reference to the block diagram of FIG. 2. Elements of FIG. 2 corresponding to elements of FIG. 1 are shown with the same reference numbers. A programmable control 100 comprises memory 104, a processor 106, and input and output interface circuits such as power interface circuits 108, and decoder 62, all of the foregoing interconnected by, for example, one or more busses to transfer data and addresses. An operator terminal 112 includes a display 114 and input devices such as keys 116. Operator terminal 112 permits display of data retrieved from memory 104 or created using keys 116 and entry of data to memory 104. Operator terminal 112 may be dedicated to control 100 or may be a portable device which is connected with control 100 only as needed for, for example, set up or maintenance of control 100. Processor 106 is a program controlled device which executes operating system programs 120 to effect control of devices connected to the control busses and to effect control of execution of other programs recorded in memory 104. Operating system programs 120 include mode control programs 122 which control the selection of control programs available for execution according to the operator determined mode of operation of the control, and workstation programs 124 which support exchanges of data with operator terminal 112.

Interface circuits 108 comprise, at least, plural independently controllable devices for delivering power from source 60 to heaters 30–38. Control of these devices is effected by program control effected by processor 106 executing programs, such as temperature control programs 130. Although represented in FIG. 2 by a single block, processor 106 may be a combination of plural processors, some of which serve primarily to support input and output of data between memory 104 and operator terminal 112 and others serving primarily to effect control of devices of interface circuits 108. In particular, processor 106 may include a plurality of independent processors associated with power interface circuits 108. Likewise, while memory 104 is represented in FIG. 2 by a single block, memory 104 may be a combination of plural memory devices, some of which serve primarily to store programs and data associated with functions involving operator terminal 112 and other devices serving to store programs and data associated with control of devices of interface circuits 108. In particular, memory 104 may include a plurality of independent memory devices associated with power interface circuits 108. Further, decoder 62 may comprise plural decoders associated with plural power interface circuits, each decoder effective to detect normal interconnection of at least one pair of A and B components of connectors 70–78.

Program control of heaters 30–38 is effected in a "normal" or "automatic" mode of operation selected by the operator. Power applied to the heaters in this mode is controlled by execution of temperature control programs 130. Control of the hot runner system is effected by execution of, for example, a set up program 126 for establishing set point values used to control zone heating, and steady state algorithm programs 128 to maintain zone temperatures at desired values. A source of electrical energy 60 is connected to power interface circuits 108. Power interface circuits 108 may comprise plural independent program controlled devices (combinations of processors and memory), each effecting control of electrical energy applied to one of heaters 30–38 to maintain sensed temperature within a working tolerance of the applicable temperature set point. Equivalent operation can be achieved wherein a single program controlled device (combination of memory and processor) evaluates plural algorithms and sequentially produces plural control signals, one to control power applied from source 60 to each of heaters 30–38. Irrespective of whether power interface circuits 108 comprise plural program controlled processors, each interface circuit of power interface circuits 108 advantageously comprise switching devices, advantageously solid state switching devices, which are controllably conductive to transfer electrical energy from source 60 to heaters 30–38.

To effect program control, processor 106 executes programs to evaluate control algorithms relating, for example, set point values, sensed values and controlled values. Plural algorithms may be employed to effect control of power applied to a single heater according to, for example, applicable conditions of the hot runner system. Hence, different algorithms may be employed for control under "start-up", "steady-state", and "idle" operation of any of heaters 30–38. Each program controlled device is responsive to, at least, a temperature set point to evaluate a control algorithm to control power applied from source 60 to one of heaters 30–38. Advantageously, at least one program controlled device is responsive to a temperature set point and sensed temperature as determined by one of temperature sensors 40–48, to control power applied to one of heaters 30–38. In accordance with the nature of the control algorithm used, set point values may be defined for: (i) temperatures for cold start up, normal, and idle operation; (ii) limits of electrical current delivered to the connected heater; (iii) control algorithm parameters such as gain (proportional constant), integral constants and differential constants; (iv) load resistance; (v) load power; (vi) thermal response lag time; and, (vii) average power to maintain temperature set point. Other data not needed for evaluation of a control algorithm, but relevant to the zone may also be stored as set points, such as for example, identification data for replacement parts for zone components. Set point values are associated with each zone, each zone having a unique identifier such as a number. Set point data are advantageously stored to permit retrieval using an index defined by an appropriate zone identifier.

Figure 2:
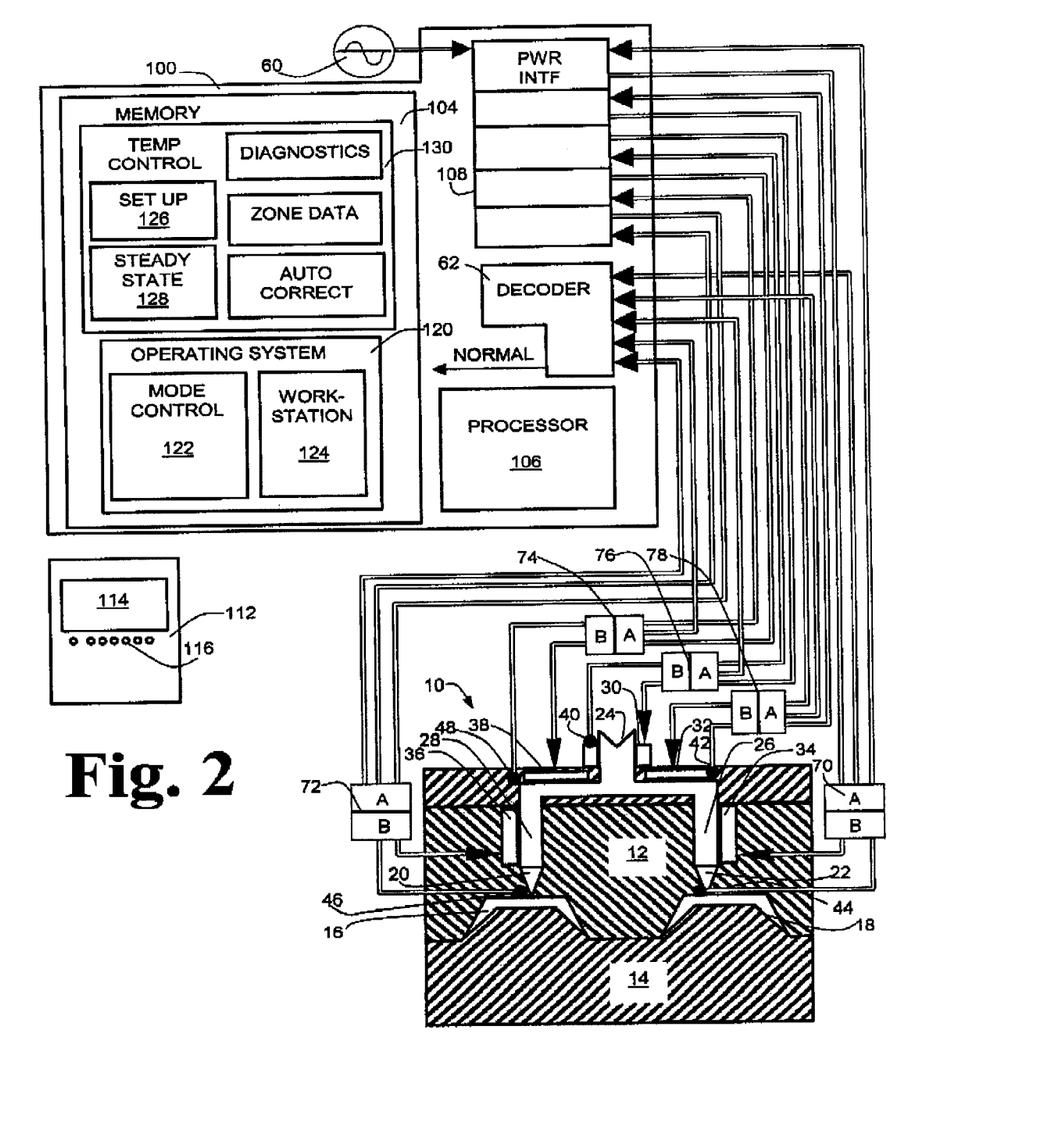
FIG. 2 is a block diagram of the heater system of FIG. 1 with programmable control devices.

The program controlled system of FIG. 2 provides facilities suitable for supporting various responses to detection of interconnection errors. The program controlled system of FIG. 2 can activate an alarm indicator at operator terminal 112, effect display of an interconnection error message on display 114, enable use of terminal 112 in a set up procedure to enable operator intervention to correct interconnection errors, or effect automated re-programming to overcome interconnection errors. A procedure for interconnection error diagnosis will be described with reference to FIG. 3 and procedures for lead-through set up and for automated re-programming will be described with reference to FIGS. 4a and 4b respectively.

Figure 3:
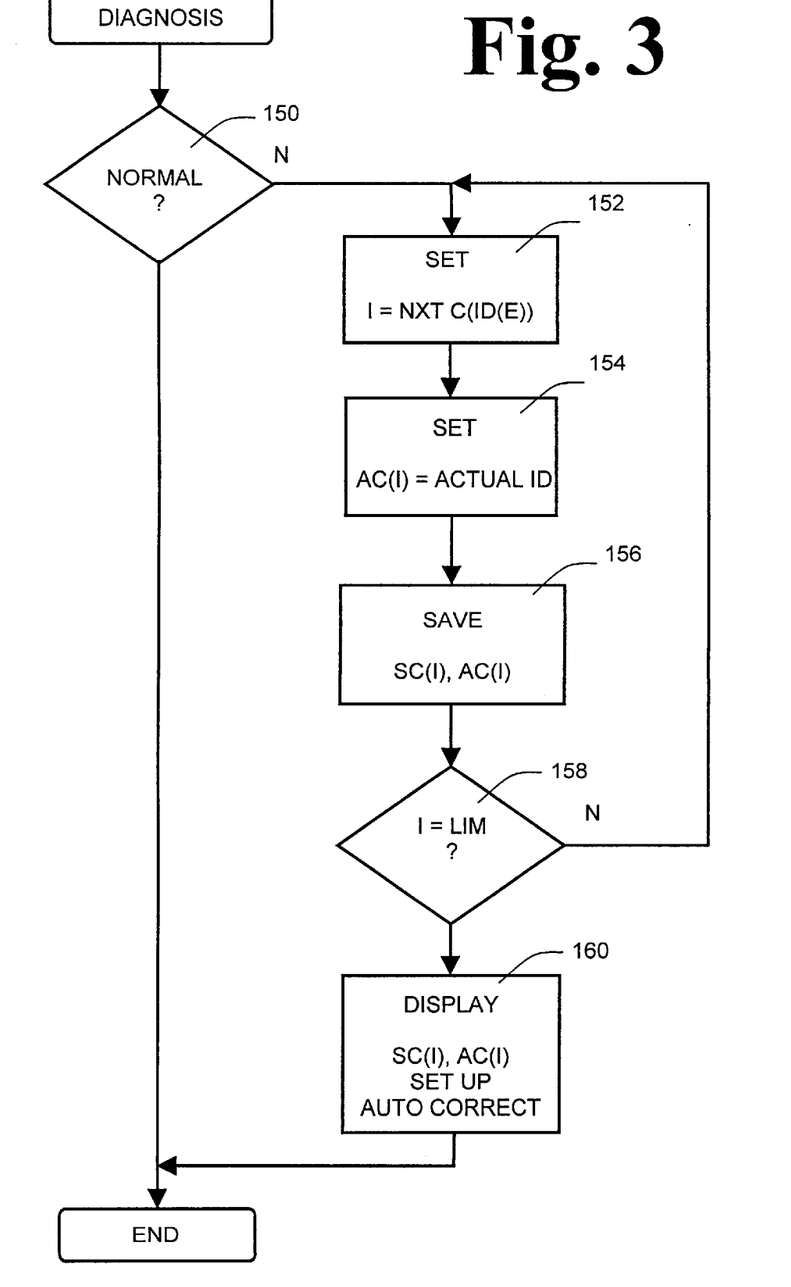
FIG. 3 is a flow chart of a procedure performed by the apparatus of FIG. 2.

The flow chart of FIG. 3 represents a diagnostic procedure advantageously executed with initiation of an automatic mode of operation. At decision step 150 indication of undesired interconnection of A and B components is detected by examination of the value of the NORMAL output of decoder 62. As previously described, decoder 2 can be implemented to produce a logical result of simultaneous comparison of identification signals for all connectors or may be implemented to store instances of detection of interconnection errors where comparisons of identification signals are performed sequentially. It is only necessary that the NORMAL signal indicate an interconnection error until all interconnection errors have been corrected or overcome. In the event the "NORMAL" output represents an undesired interconnection, at process step 152 the procedure selects a connector for which an undesired interconnection is detected as represented by "C(ID(E))" where "ID(E)" is the identification value for a connector where an interconnection error was detected. The selected connector identification defines an index "I" for selecting sets of data associated with the selected connector, including: an intended (expected) connector identification value ("IC(I)") corresponding to the identification of a connector expected to be connected with the selected connector and an actual connected connector identification ("AC(I)") corresponding to the identification of the connector actually connected to the selected connector. At process step 154, the actual identification signals at the B component of the selected connector ("SC(I)") are retrieved to establish the actual connector identification "AC(I)". At process step 156, the selected connector identification ("SC(I)") and the actual connector identification ("AC(I)") are saved as an associated pair. At decision step 158, it is determined whether the index "I" is equal to the limit "LIM" representing the total number of connectors. If not, processing continues at step 152 where the index "I" is updated to the next connector identification for which an interconnection error has been detected by decoder 62, Processing continues in a loop from step 152 through decision step 158 until the selected connector identification and actual connector identification data pairs have been saved for all connectors for which interconnection errors have been detected. Thereafter execution continues at process step 160 where saved connector identification pairs for all connectors for which interconnection errors have been detected are presented on display 114.

In addition to the connector identification pairs, displays are presented at display 114 indicating alternatives on which the operator may choose to proceed. In particular, the operator may choose Auto Correct to effect automated reprogramming of data associated with undesired interconnections, or Set UP to effect manual reprogramming of data associated with undesired interconnections and/or manual re-connection of connector components to the intended connection. Operator selection of Set Up from terminal 112 initiates execution of a Set Up procedure illustrated by the flow chart of FIG. 4a. Operator selection of Auto Correct initiates execution of an automated re-programming procedure illustrated by the flow chart of FIG. 4b.

Figure 4A:
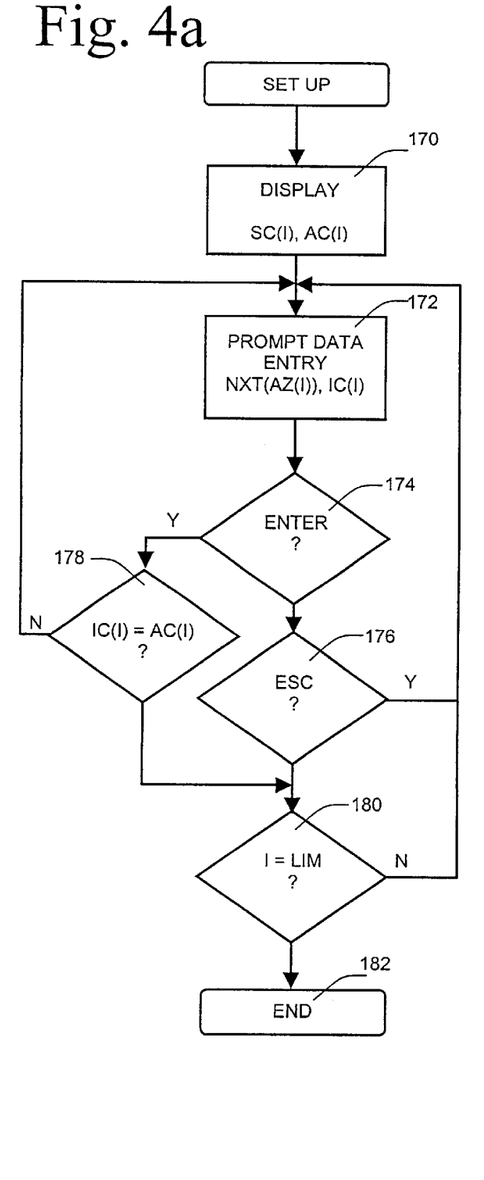
FIGS. 4a and 4b are flowcharts of procedures performed by the apparatus of FIG. 2.

Those steps of a Set Up procedure comprising interactive facilitation of user intervention to selectively correct and overcome interconnection errors are illustrated by the flow chart of FIG. 4a. At process step 170 data for a selected connector for which an interconnection error was detected are displayed, including the selected connector identification ("SC(I)") and associated zone identifiers (numbers) and the identification of the actual connected B component ("AC(I)") together with associated zone numbers. At process step 172 data entry is prompted at display 114, by, for example, highlighting a zone number of the actual connected connector. To facilitate manual reprogramming, the operator may enter the zone numbers of the actual connected connector to replace the zone numbers associated with the selected connector. Set point data associated with the zone numbers is not changed by the reassignment of zone numbers. Hence, set point data associated with zones of the actual connected connector remain in place. Data entries are effected with operation of an "Enter" key at terminal 112. Decision step 174 detects operation of the "Enter" key. Skipping of a selected connector may be effected by operation of an "Escape" key. Decision step 176 detects operation of the "Escape" key.

To overcome the interconnection error, the operator may replace zone numbers as described or change the actual interconnection to the expected interconnection. In the event data entries are made, decision step 178 determines whether the intended connector identification and the actual connector identification associated with the selected connector are equal. To eliminate detection of an interconnection error, the identification of the actual connector ("AC(I)") and the intended connector identification ("IC(I)") must agree. Hence, until the operator has entered an intended connector identification equal to the actual connector identification associated with the selected connector, decision step 178 will continue to redirect execution of the procedure of FIG. 4a to process step 172 to prompt data entry, notwithstanding that zone numbers associated with the selected connector have been replaced.

Proceeding from decision step 178, execution of the procedure of FIG. 4a continues at decision step 180 where it is determined whether the index "I" is equal to a limit value "LIM" corresponding to the total number of connectors. If not, execution continues at process step 170 where the connector identification is selected for the next connector for which an interconnection error was detected. Once the index "I" has reached the limit value, execution of the procedure of the flow chart of FIG. 4a is complete and execution ends at terminal 182. It is to be understood, that in the event of an interconnection error, there can be no less than two instances of detection of a difference between the actual connector identification ("AC(I)") and the intended connector identification ("IC(I)"). Hence, to overcome the interconnection error by re-programming it is necessary to re-program zone identifiers for pairs of selected connectors corresponding to the connectors for which mating components have been switched. The loop from decision step 180 through process steps 170 insures that required re-programming will be prompted.

Should the operator not wish to alter programming for a selected connector, a different connector may be selected by operation of the Escape key. On detection of operation of the Escape Key execution continues at decision step 180 from which execution may continue or end according to the value of the index "I", as herein described. In the Set Up mode, outputs of interface circuits 108 are advantageously inhibited, including inhibiting application of power to heaters 30–38. Hence re-connection of connectors 70–78 may be effected without hazard to personnel or equipment. Use of "Escape" permits the operator to control execution of the Set Up procedure under the circumstances that manual re-connection is contemplated to eliminate at least some interconnection errors. Once the execution of the Set Up procedure of FIG. 4a ends, the operator may initiate operation of automatic mode, causing re-execution of diagnostic routines 130 prior to application of power to heaters 30–38.

Figure 4B:
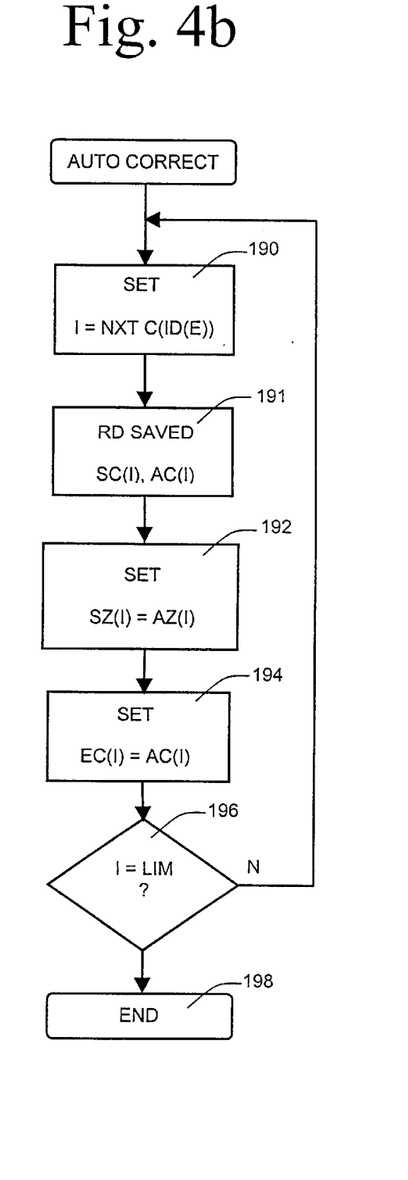

Automated re-programming to overcome interconnection errors may be effected in accordance with a procedure illustrated by the flow chart of FIG. 4b. At process step 190, the connector index "I" is set equal to the connector identification of a connector for which an interconnection error has been detected. At process step 191 the selected connector and actual connector identification values are retrieved from the data saved at process step 156 of FIG. 3 for the connector selected at process step 190. At process step 192 zone identifiers (numbers) ("AZ(I)") associated with the actual connector are set into the memory to replace the zone identifiers association with the selected connector ("SZ(I)"). At process step 194 the identification signals for the intended (expected) connector ("IC(I)") associated with the selected connector ("SC(I)") are replaced with the identification signals for the actual connector ("AC(I)").

As a consequence of process step 194, decoder 62 will not detect an undesired interconnection for the selected connector ("SC(I)"). Following execution of step 194, execution of the procedure of FIG. 4b continues at decision step 196 where it is determined whether the zone index is equal to a limit value "LIM" equal to the number of connectors. If not, execution of the procedure continues in a loop beginning with process step 190 to reprogram zone identifiers and intended connector identifications for all of the connectors for which interconnection errors ("E(ID)") were detected. Once all re-programming is complete, process step 198 returns control of execution to the automatic mode of operation to begin controlled heating. As with the Set Up procedure, resumption of automatic operation begins with execution of the diagnostic routines 130 prior to application of power to heaters 30–38.

To illustrate reprogramming effected by the procedure illustrated by FIG. 4, an example will be described with reference to FIG. 2. It will be understood that with all components of connectors 70–78 mated, there can be no fewer than two undesired interconnections. For the example it will be presumed that actual interconnection of A and B components of connectors 70 and 78 resulted in interconnection of a power interface circuit intended for heater 32 with heater 34 and a power interface circuit intended for heater 34 with heater 32, It will further be assumed that in all respects other than set points used for evaluation of the control algorithms, the control effected by the interface circuits for heaters 34 and 32 are substantially identical. As a result of the undesired interconnection, the NORMAL output of decoder 62 will indicate an interconnection error. The saving of identifications for the affected connectors is accomplished by the steps of FIG. 3 beginning with decision step 150 and continuing through process step 156. The saved selected connector identifications ("SC(I)") and actual connector identifications ("AC(I)") will correspond to the identifications for connectors 70 and 78. Steps 190 through 194 of FIG. 4b effect re-programming of zone identifiers associated with connectors so that set points intended for use with the algorithms used to control heaters 32 and 34 are used in connection with control of the interface circuits actually connected with heaters 32 and 34 irrespective of the interconnection error. Consequently, the control algorithm controlling application of electrical energy to heater 32 is evaluated as appropriate for heater 32 and the control algorithm associated with application of electrical energy to heater 34 is likewise evaluated as appropriate for heater 34, notwithstanding that the control interface circuit intended to be connected to heater 34 is actually connected to heater 32 and vice versa. At the same time, the expected identification signals for connectors 70 and 78 would be re-programmed to eliminate the discrepancy between the actual interconnection and the intended interconnection. Whereby, decoder 62 would no longer indicate undesired interconnection so that execution of the diagnostic routines would not result in initiation of any error responses.

It is contemplated that functional equivalents of the procedures illustrated and described with reference to the flow charts of FIGS. 3, 4a and 4b can be readily substituted to achieve the same results. It is not intended that the invention be limited to the specifics of those procedures, but that the invention be defined by the scope of the appended claims.

What is claimed is:

1. An electrical apparatus wherein plural devices are interconnected, the devices comprising plural electrical heaters and plural controllers therefore, the apparatus comprising:
   a) plural coupling connectors, each connector comprising first and second mating connector components at each of which conductors from devices are terminated and wherein interconnection of any particular heater with any particular controller is achieved by coupling of particular mating connector components;
   b) identification elements in one mating component of each connector for producing identification signals representing identity of the mating connector component;
   c) decoding means responsive to the identification signals for producing an error signal representing an interconnection error resulting from coupling of mating connector components differing from the particular mating connector component;
   d) means responsive to the error signal for effecting a response.

2. The electrical apparatus of claim 1 wherein the response comprises actuating an indicator for indicating an interconnection error.

3. The electrical apparatus of claim 1 wherein the response comprises inhibiting application of electrical power to at least those heaters affected by an interconnection error.

4. The electrical apparatus of claim 3 wherein the means responsive to the error signal comprises a switching device selectively conducting power to the heaters, whereby power is not conducted to the heaters in response to detection of an interconnection error.

5. The electrical apparatus of claim 1 wherein the controllers comprise program controlled devices.

6. The electrical apparatus of claim 5 wherein the response comprises display of an interconnection error message.

7. The electrical apparatus of claim 5 wherein the response comprises inhibiting application of electrical power to at least those heaters affected by an interconnection error.

8. The electrical apparatus of claim 5 wherein the response comprises interactive facilitation of user intervention to selectively correct and overcome interconnection errors.

9. The electrical apparatus of claim 5 wherein the response comprises automated re-programming of data to effect operation of the heaters according to the desired interconnection of heaters and controllers irrespective of the actual coupling of mating connector components differing from the particular mating connector components.

10. The electrical apparatus of claim 9 wherein the re-programming further comprises re-assignment of heater data associated with connector identification data to associate heater data with connector identification data in accordance with the actual coupling of mating connector components.

11. The electrical apparatus of claim 10 wherein the heater data includes set points used in evaluation of control algorithms for controlling application of power to the heaters.

12. The electrical apparatus of claim 11 wherein each control algorithm relates a set point temperature and applied power to effect control of application of power to a heater.

13. The electrical apparatus of claim 12 wherein at least one control algorithm relates a set point temperature, a sensed temperature and applied power to effect control of application of power to a heater.

14. The electrical apparatus of claim 10 wherein the heaters are associated with zone identifiers and re-assignment of heater data comprises re-assignment of zone identifiers to associate zone identifiers with connector identifications in accordance with the actual coupling of mating connector components.

15. The electrical apparatus of claim 14 wherein the heater data includes set points used in evaluation of control algorithms for controlling application of power to the heaters, one set of set point data being associated with each zone identifier.

16. The electrical apparatus of claim 15 wherein each control algorithm relates a set point temperature and applied power to effect control of application of power to a heater.

17. The electrical apparatus of claim 15 wherein at least one control algorithm relates a set point temperature, a sensed temperature and applied power to effect control of application of power to a heater.

* * * * *